Oct. 6, 1970 R. M. MUNOZ 3,533,098

NONLINEAR ANALOG-TO-DIGITAL CONVERTER

Filed March 25, 1966 2 Sheets-Sheet 1

INVENTOR.
ROBERT M. MUÑOZ

BY

ATTORNEYS

Oct. 6, 1970 R. M. MUNOZ 3,533,098

NONLINEAR ANALOG-TO-DIGITAL CONVERTER

Filed March 25, 1966 2 Sheets-Sheet 2

INVENTOR.
ROBERT M. MUÑOZ

BY [signature]

[signature]

ATTORNEYS

United States Patent Office 3,533,098
Patented Oct. 6, 1970

3,533,098
NONLINEAR ANALOG-TO-DIGITAL CONVERTER
Robert M. Muñoz, Los Altos, Calif., assignor to the United States of America as represented by the Administrator of the National Aeronautics and Space Administration
Filed Mar. 25, 1966, Ser. No. 538,905
Int. Cl. H03k 13/04
U.S. Cl. 340—347 4 Claims

ABSTRACT OF THE DISCLOSURE

A continuous analog-to-digital converter with a parallel digital output that is characterized by improved accuracy, especially in the low end of the scale. Error is reduced by introducing a very accurate nonlinearity in the feedback path. Instead of a linear feedback factor, the feedback voltage is varied in accordance with the function $N/1-N$, wherein N is the ratio of the digital output number to the number that represents full scale. Only two components are needed to produce the nonlinearity.

The invention described herein was made by an employee of the United States Government and may be manufactured and used by or for the Government for governmental purposes without the payment of any royalties thereon or therefor.

This invention relates in general to analog-to-digital converters, and relates more particularly to such converters having nonlinear response characteristics.

In all analog-to-digital converters (hereinafter referred to as ADC), regardless of type, one of the continuing problems is that of error. This error arises as a result of the inability of the ADC to measure input signal levels smaller than the least significant digit in the digital numbering system employed. As an example of this type of error, consider and ADC employing a 6-bit binary code, with a resulting overall accuracy of one bit or one part in 64. This produces an error of 1.6%, or ±0.8%. If the full scale input voltage for such a digital system is 10 volts, this represents a possible error of ± 80 millivolts. However, where the input voltage is a small fraction of full scale, say 1 volt, the total possible error is still ±8% of the reading. Thus, unless it can be guaranteed that the input signal levels will be a substantial part of full scale most of the time, such an ADC will present serious accuracy problems.

In order to provide a system in which the accuracy, expressed as a function of operating level, remains more nearly constant, the present invention provides scale compression in a nonlinear ADC system by introducing a very accurate nonlinearity in the feedback path of a feedback-type ADC. This feedback path includes a conventional digital attenuator, which is employed to convert the digital output signal from the ADC to a corresponding analog signal which is fed back for comparison with the analog input signal to be converted. In the preferred form of this invention, the desired nonlinearity is introduced directly into the digital attenuator circuitry, so that the feedback voltage is modified by the nonlinearity introduced. Thus, the feedback voltage varies nonlinearly with the digital output of the ADC to produce a nonlinear response characteristic for the system. This nonlinear response characteristic produces a scale compression which results in improved error characteristics for the system, since the system error, expressed in percentage of reading, is more linearly constant than with a system having a linear response.

As an additional feature of this invention, the desired nonlinearity is introduced by components which are capable of high accuracy and which are extremely stable with respect to temperature and time. A further feature of the invention is that the desired nonlinearity may be produced by adding only a single component to a conventional feedback-type ADC.

It is therefore an object of this invention to provide an improved analog-to-digital converter having a nonlinear response characteristic.

It is a further object of this invention to provide an analog-to-digital converter of the feedback type in which a very accurate nonlinearity is introduced into the feedback path to produce a nonlinear response for the system.

It is an additional object of this invention to provide an analog-to-digital converter of the feedback type employing a digital attenuator in the feedback path, in which a very accurate nonlinearity is introduced into the digital attenuator circuitry to produce a nonlinear response for the system.

It is a further object of this invention to provide an analog-to-digital converter of the feedback type in which a very accurate nonlinearity is introduced into the feedback path to produce a nonlinear response for the system, the component which produces the nonlinearity being extremely stable with respect to time and temperature.

It is an additional object of the present invention to provide an analog-to-digital converter of the feedback type employing a digital attenuator in the feedback path, in which a very accurate nonlinearity is introduced into the feedback path to provide a nonlinearity response for the system, the nonlinearity being produced by the introduction of only a single component into a conventional feedback-type analog-to-digital converter.

Objects and advantages other than those set forth above will be apparent from the following description when read in connection with the accompanying drawings, in which.

Figure 1:
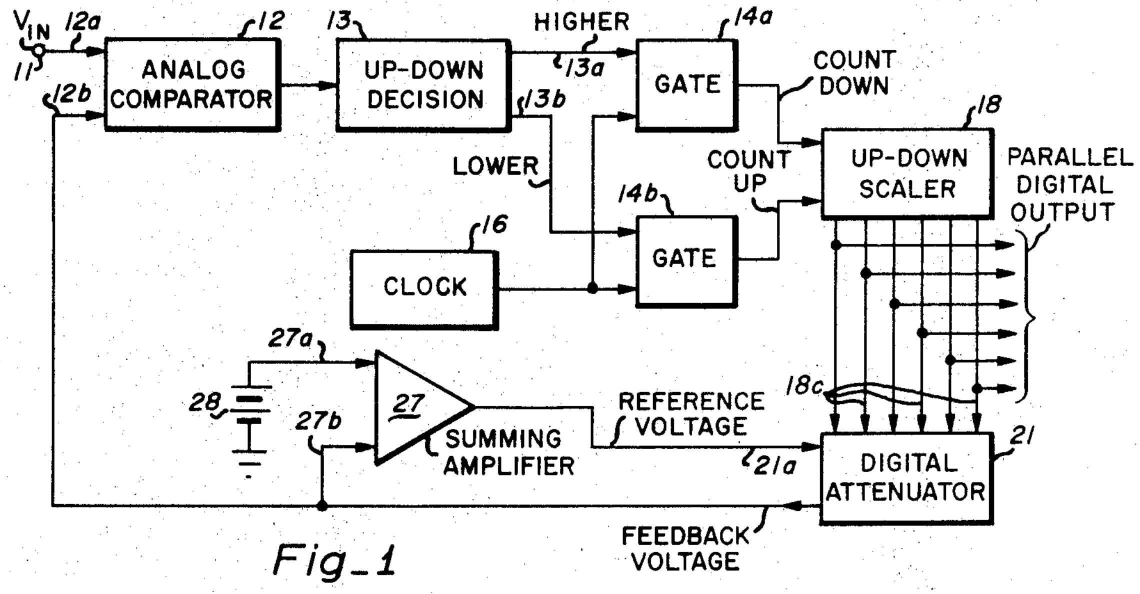
FIG. 1 is a schematic showing, in block diagram form, of one embodiment of the present invention employing a summing amplifier to introduce a nonlinearity into a feedback-type ADC.
Figure 2:
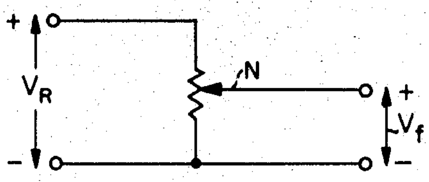
FIG. 2 is a functional diagram of the digital attenuator of a linear ADC system of the prior art.
Figure 3:
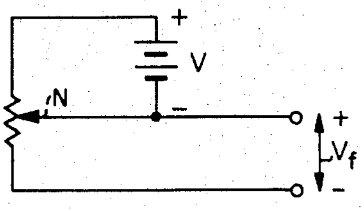
FIG. 3 is a functional diagram of a digital attenuator in accordance with this invention employing a battery to introduce the desired nonlinearity.
Figure 4:
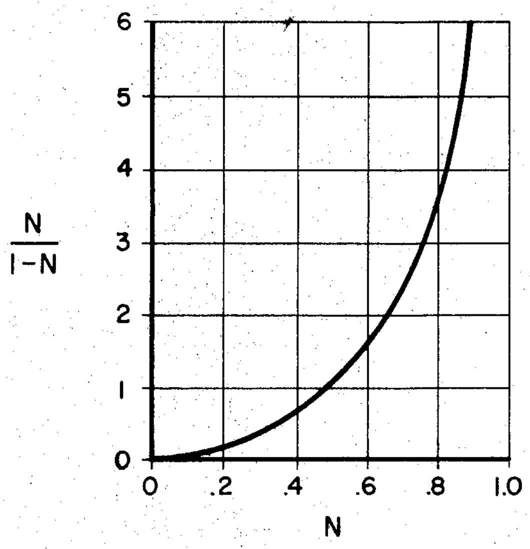
FIG. 4 is a graph illustrating the effect of variations in the normalized output number N, of an ADC system on the nonlinear quantity $N/1-N$.
Figure 5:
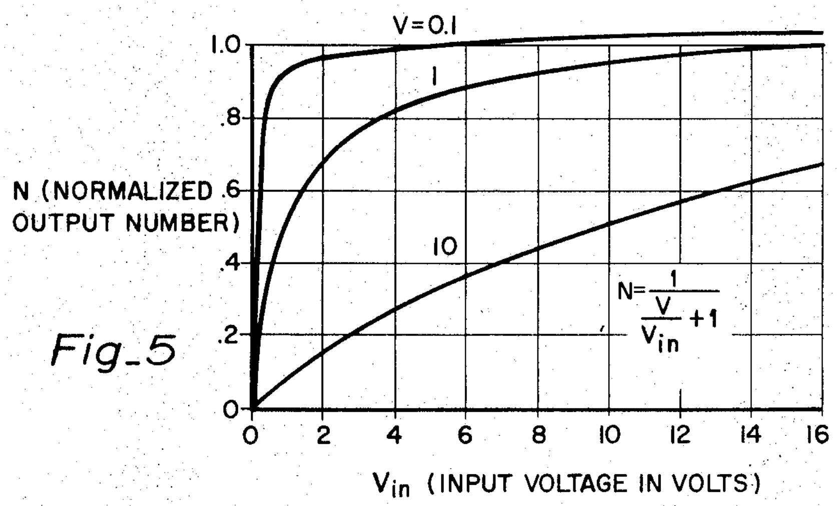
Figure 6:
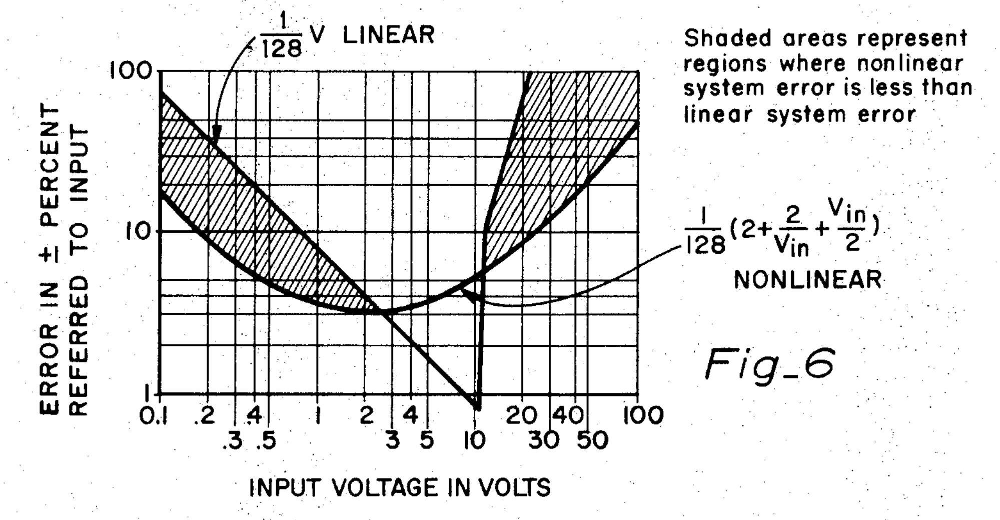
Figure 1:
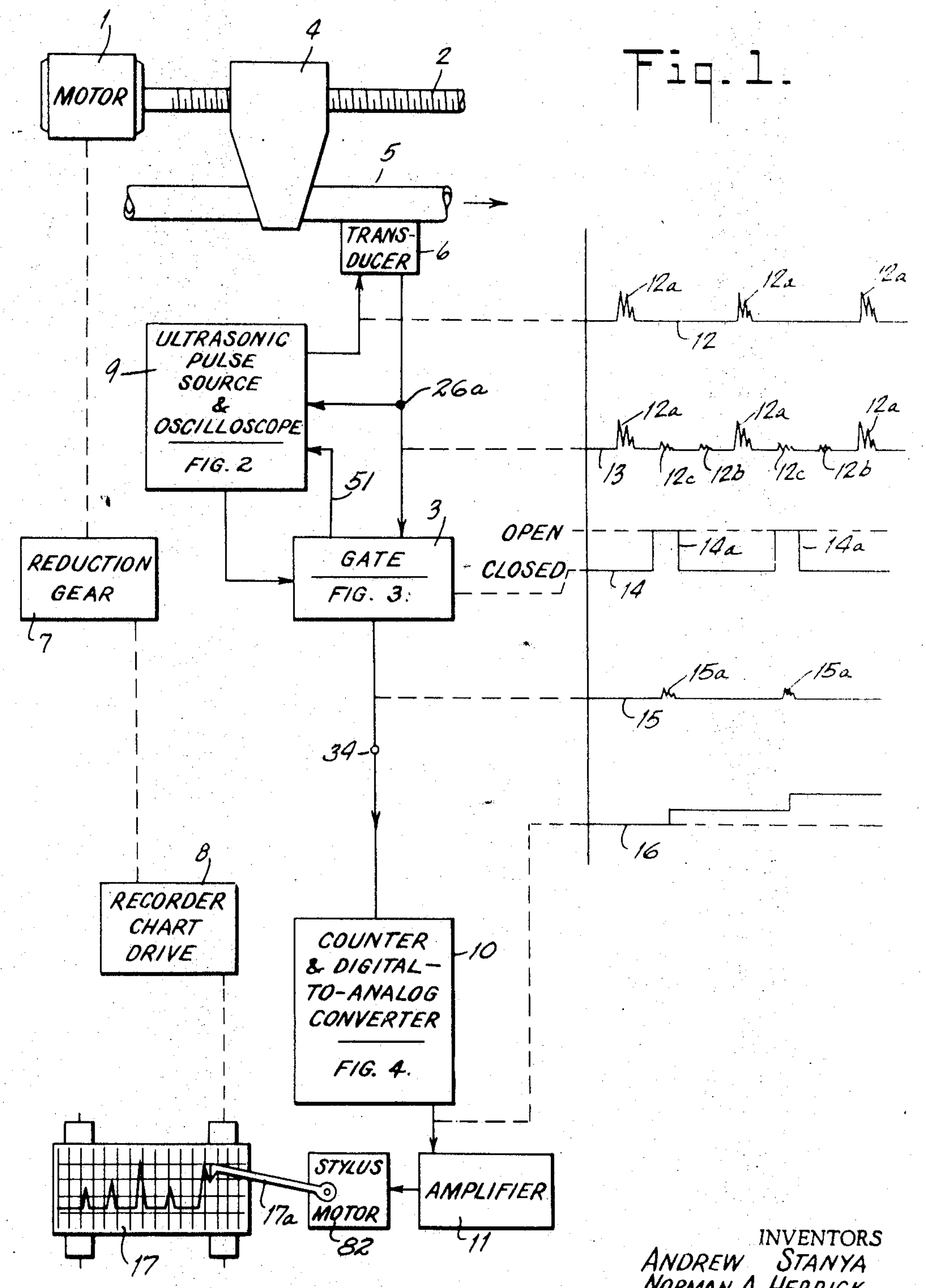

FIG. 5 is a graph illustrating variations of the normalized output number, N, with changes in the analog input signal for different values of the voltage of the battery of FIG. 3; and means coupled to said generator and said counting means for comparing said reference voltage and said digital output signals and generating said analog feedback signal; and means for coupling said feedback signal to said second input of said amplifier and to said comparator means;

said feedback signal being nonlinear and causing a reduction in error over a portion of the voltage range of said apparatus.

2. Apparatus in accordance with claim 1 wherein the feedback signal varies as a function of $N/1-N$, and N is the normalized digital output representing the ratio of the digital output from said counting means to the scale capability of said counting means.

3. Apparatus for continuously converting an analog input signal to a parallel digital output comprising:

comparator means for comparing an analog input signal to a nonlinear analog feedback signal and generating an output signal representing the difference between said signals;

means for generating clock pulses;

an up-down scaler producing parallel digital output signals;

logic means coupled to said comparator means, said clock pulse means and said scaled for enabling said clock pulses to reach said scaler when said comparator means output signal has a magnitude other than zero, said scaler counting up when said analog input signal exceeds said feedback signal and said scaler counting down when said feedback signal exceeds said analog input signal;

means coupled to said scaler for comprising said scaler digital output signals with a reference voltage and generating said nonlinear analog feedback signal;

a summing amplifier having first and second inputs, said amplifier generating a reference voltage which is coupled to said comparing means;

a D-C voltage source coupled to said first amplifier input; and means for coupling said feedback signal from said comparing means to said second amplifier input and said comparator means.

4. Apparatus in accordance with claim 3 wherein the feedback signal varies as a function of $N/1-N$, and N is the normalized digital output representing the ratio of the digital output from said scaler to the full scale capability of said scaler.

References Cited

UNITED STATES PATENTS

| | | | |
|---|---|---|---|
| 3,065,422 | 11/1962 | Villars | 340—347 |
| 3,127,601 | 3/1964 | Kaenel | 340—347 |
| 3,298,014 | 1/1967 | Stephenson | 340—347 |
| 3,345,630 | 10/1967 | Osamu Tada | 340—347 |
| 3,384,889 | 5/1968 | Lucas | 340—347 |
| 3,189,891 | 6/1965 | Karsh. | |

MAYNARD R. WILBUR, Primary Examiner

J. GLOSSMAN, Assistant Examiner

PULSE COUNTER AND CONVERTER

Original Filed April 8, 1963 6 Sheets-Sheet 1

INVENTORS
ANDREW STANYA
NORMAN A. HERRICK
BY
ATTORNEY